US010618466B2

(12) United States Patent
Jang et al.

(10) Patent No.: US 10,618,466 B2
(45) Date of Patent: Apr. 14, 2020

(54) METHOD FOR PROVIDING SOUND DETECTION INFORMATION, APPARATUS DETECTING SOUND AROUND VEHICLE, AND VEHICLE INCLUDING THE SAME

(71) Applicant: HYUNDAI MOTOR COMPANY, Seoul (KR)

(72) Inventors: Yoon Ho Jang, Suwon-si (KR); Jae Kwang Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 505 days.

(21) Appl. No.: 15/367,908

(22) Filed: Dec. 2, 2016

(65) Prior Publication Data

US 2017/0259737 A1 Sep. 14, 2017

(30) Foreign Application Priority Data

Mar. 10, 2016 (KR) ........................ 10-2016-0028655

(51) Int. Cl.
*B60Q 9/00* (2006.01)
*G08G 1/16* (2006.01)
(Continued)

(52) U.S. Cl.
CPC .............. *B60Q 9/00* (2013.01); *G01S 3/8003* (2013.01); *G01S 3/8083* (2013.01); *G08G 1/166* (2013.01); *G08G 1/167* (2013.01)

(58) Field of Classification Search
USPC ........................................................ 701/300
See application file for complete search history.

(56) References Cited

U.S. PATENT DOCUMENTS

| 9,043,992 | B2 | 6/2015 | Viikari et al. |
| 2015/0061895 | A1* | 3/2015 | Ricci ........................ G06F 16/25 340/902 |

(Continued)

FOREIGN PATENT DOCUMENTS

| JP | 06-344839 A | 12/1994 |
| JP | 2002-168685 A | 6/2002 |

(Continued)

OTHER PUBLICATIONS

Office Action Korean Patent Application No. 10-2016-0028655 dated Mar. 31, 2017.

*Primary Examiner* — James M McPherson
(74) *Attorney, Agent, or Firm* — Morgan, Lewis & Bockius LLP

(57) ABSTRACT

A method for providing sound tracking information includes detecting a sound occurred adjacent to a subject vehicle to generate a sound tracking result based at least on a sound data regarding detected sound; determining an angle of point having the maximum probability among at least one of peak points in the sound tracking result as a first vehicle angle; determining whether an angle of candidate point is a second vehicle angle, wherein the candidate point has the maximum probability among peak points included in a detection range except for the first vehicle angle; and generating at least one detection signal corresponding to the first and the second vehicle angles, when the angle of candidate point is the second vehicle angle, wherein the sound tracking result includes a probability of whether there is at least one another vehicle at each of angles in each of frames continued according to time.

14 Claims, 12 Drawing Sheets

(51) Int. Cl.
*G01S 3/80* (2006.01)
*G01S 3/808* (2006.01)

(56) References Cited

U.S. PATENT DOCUMENTS

2015/0323785 A1* 11/2015 Fukata .................. G08G 1/166
  348/148
2017/0309175 A1* 10/2017 Kim ..................... G08G 1/0962

FOREIGN PATENT DOCUMENTS

| JP | 2009251799 A | 10/2009 |
| JP | 2011242343 A | 12/2011 |
| JP | 5397735 B2 | 1/2014 |
| JP | 5628535 B2 | 11/2014 |
| WO | 2008/056649 A1 | 5/2008 |

* cited by examiner

METHOD FOR PROVIDING SOUND DETECTION INFORMATION, APPARATUS DETECTING SOUND AROUND VEHICLE, AND VEHICLE INCLUDING THE SAME

CROSS-REFERENCE TO RELATED APPLICATION

This application claims priority to and the benefit of Korean Patent Application No. 10-2016-0028655, filed on Mar. 10, 2016 in the Korean Intellectual Property Office, the disclosure of which is hereby incorporated by reference in its entirety as if fully set forth herein.

TECHNICAL FIELD

The disclosure relates generally to a method for providing sound detection information and an apparatus for detecting a sound being around a subject vehicle, and more particularly, to a method and an apparatus for providing tracking information about sounds so as to recognize vehicles running adjacent to a subject vehicle, and a vehicle capable of recognizing a traffic based on the tracking information about the sounds via a driver assistance device.

BACKGROUND

There are various types of sounds adjacent to a vehicle driving on a road. If a driver is an aged person having at least partially impaired hearing or a person who has a bad sense of sound direction, he or she would be insensitive to respond to a particular sound made by a warning horn, a siren or the like, which he or she should pay attention to. In addition, since an in-vehicle technology regarding sound insulation has been developed, it is likely that even a driver having great hearing could not correctly hear a noise/sound occurred outside a vehicle. It might be driver's safety at risk that the driver does not keep eyes forward when he or she listens to a specific sound from the rear of the vehicle.

Accordingly, it might be necessary that information about a particular sound, such as what kind of sounds exists adjacent to a vehicle, which direction a sound comes from, and the like, is informed to a driver without disruptions to driving safety. Particularly, when plural vehicles may be operating near a subject vehicle, a driving safety would be enhanced if there are notifications or alerts regarding the plural vehicle.

SUMMARY

An apparatus, a method and a vehicle are for providing to a driver specific information regarding plural vehicles running adjacent to the vehicle based at least on tracking information about sounds.

A method for providing sound tracking information can include detecting a sound occurred adjacent to a subject vehicle to generate a sound tracking result based at least on a sound data regarding detected sound; determining an angle of point as a first vehicle angle, wherein the point has the maximum probability among at least one of peak points in the sound tracking result; determining whether an angle of candidate point is a second vehicle angle, wherein the candidate point has the maximum probability among plural peak points included in a detection range except for the first vehicle angle; and generating at least one detection signal corresponding to the first and the second vehicle angles, in response to a determination that the angle of candidate point is the second vehicle angle, wherein the sound tracking result includes a probability of whether there is at least one another vehicle at each of angles in each of frames continued according to time.

The method can further include detecting at least one of peak point and at least one of nadir point from the sound tracking result, wherein each peak point is a unique point having the maximum probability in every angle-range having a higher probability than a value subtracting a threshold value from a probability of peak point, while the at least one of nadir point is a unique point having the minimum probability in every angle-range having a lower probability than a value adding the threshold value from a probability of nadir point.

The method can further include splitting a rearward area of the subject vehicle into a non-detection region, a first detection region and a second detection region based on the at least one of nadir point.

The method can further include skipping generation of detection signal regarding another peak point in at least one of the first detection region and the second detection region, including the first vehicle angle.

The determining whether an angle of candidate point is a second vehicle angle can include determining whether an angle between two intersecting lines is smaller than a threshold angle, wherein two intersecting lines include one line between the candidate point and a first point and the other line between the candidate point and a second point; and assigning the angle of candidate point as the second vehicle angle in response to a determination that the angle is smaller than the threshold angle.

Further, the first point is the minimum point having the maximum angle before the candidate point from an operating direction of the subject vehicle, while the second point is the minimum point having the minimum angle after the candidate point from the operating direction.

Furthermore, the determining whether an angle of candidate point is a second vehicle angle can include calculating a kurtosis in a predetermined angle-range pivoting on the candidate point; determining whether the kurtosis is equal to or larger than a threshold kurtosis; and assigning the angle of candidate point as the second vehicle angle in response to a determination that the kurtosis is equal to or larger than the threshold kurtosis.

An apparatus for providing sound tracking information can include a sound tracker configured to detect a sound occurred adjacent to a subject vehicle to generate a sound tracking result based at least on a sound data regarding detected sound; and a vehicle information processor configured to determine an angle of point as a first vehicle angle in the sound tracking result, wherein the point has the maximum probability among at least one of peak points, to determine whether an angle of candidate point is a second vehicle angle, wherein the candidate point has the maximum probability among plural peak points included in a detection range except for the first vehicle angle, and to generate at least one detection signal corresponding to the first and the second vehicle angles, in response to a determination that the angle of candidate point is the second vehicle angle, wherein the sound tracking result includes a probability of whether there is at least one another vehicle at each of angles in each of frames continued according to time.

The vehicle information processor is configured to detect at least one of peak point and at least one of nadir point from the sound tracking result, wherein each peak point is a unique point having the maximum probability in every angle-range having a higher probability than a value subtracting a threshold value from a probability of peak point, while the at least one of nadir point is a unique point having the minimum probability in every angle-range having a lower probability than a value adding the threshold value from a probability of nadir point.

The vehicle information processor is configured to split a rearward area of the subject vehicle into a non-detection region, a first detection region and a second detection region based on the at least one of nadir point.

The vehicle information processor is configured to skip generation of detection signal regarding another peak point in at least one of the first detection region and the second detection region, including the first vehicle angle.

The vehicle information processor is configured to determine whether an angle between two intersecting lines is smaller than a threshold angle, wherein two intersecting lines include one line between the candidate point and a first point and the other line between the candidate point and a second point, and to assign the angle of candidate point as the second vehicle angle in response to a determination that the angle is smaller than the threshold angle.

The first point is the minimum point having the maximum angle before the candidate point from an operating direction of the subject vehicle, while the second point is the minimum point having the minimum angle after the candidate point from the operating direction.

The vehicle information processor is configured to calculate a kurtosis in a predetermined angle-range pivoting on the candidate point, to determine whether the kurtosis is equal to or larger than a threshold kurtosis, and to assign the angle of candidate point as the second vehicle angle in response to a determination that the kurtosis is equal to or larger than the threshold kurtosis.

A vehicle can include a multi-channel microphone configured to detect a sound occurred adjacent to a subject vehicle to generate a sound data regarding the sound; a sound tracking device configured to determine an angle of point as a first vehicle angle in the sound tracking result based at least on the sound data, wherein the point has the maximum probability among at least one of peak points, to determine whether an angle of candidate point is a second vehicle angle, wherein the candidate point has the maximum probability among plural peak points included in a detection range except for the first vehicle angle, and to generate at least one detection signal corresponding to the first and the second vehicle angles, in response to a determination that the angle of candidate point is the second vehicle angle; and a notification interface configured to acoustically or visually inform a driver of information about at least one vehicle adjacent to the subject vehicle based on the generated detection signal, wherein the sound tracking result includes a probability of whether there is at least one another vehicle at each of angles in each of frames continued according to time.

An apparatus is for providing sound tracking information in a vehicle including a processing system that comprises at least one data processor and at least one computer-readable memory storing a computer program. Herein, the processing system is configured to cause the apparatus to: detect a sound occurred adjacent to a subject vehicle to generate a sound tracking result based at least on a sound data regarding detected sound; determine an angle of point as a first vehicle angle, wherein the point has the maximum probability among at least one of peak points in the sound tracking result; determine whether an angle of candidate point is a second vehicle angle, wherein the candidate point has the maximum probability among plural peak points included in a detection range except for the first vehicle angle; and generate at least one detection signal corresponding to the first and the second vehicle angles, in response to a determination that the angle of candidate point is the second vehicle angle, wherein the sound tracking result includes a probability of whether there is at least one another vehicle at each of angles in each of frames continued according to time.

A non-transitory computer readable medium can store a program causing a processing system (or a processor) to execute a process for providing sound tracking information. The process, when executed by the processing system, includes detecting a sound occurred adjacent to a subject vehicle to generate a sound tracking result based at least on a sound data regarding detected sound; determining an angle of point as a first vehicle angle, wherein the point has the maximum probability among at least one of peak points in the sound tracking result; determining whether an angle of candidate point is a second vehicle angle, wherein the candidate point has the maximum probability among plural peak points included in a detection range except for the first vehicle angle; and generating at least one detection signal corresponding to the first and the second vehicle angles, in response to a determination that the angle of candidate point is the second vehicle angle, wherein the sound tracking result includes a probability of whether there is at least one another vehicle at each of angles in each of frames continued according to time.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
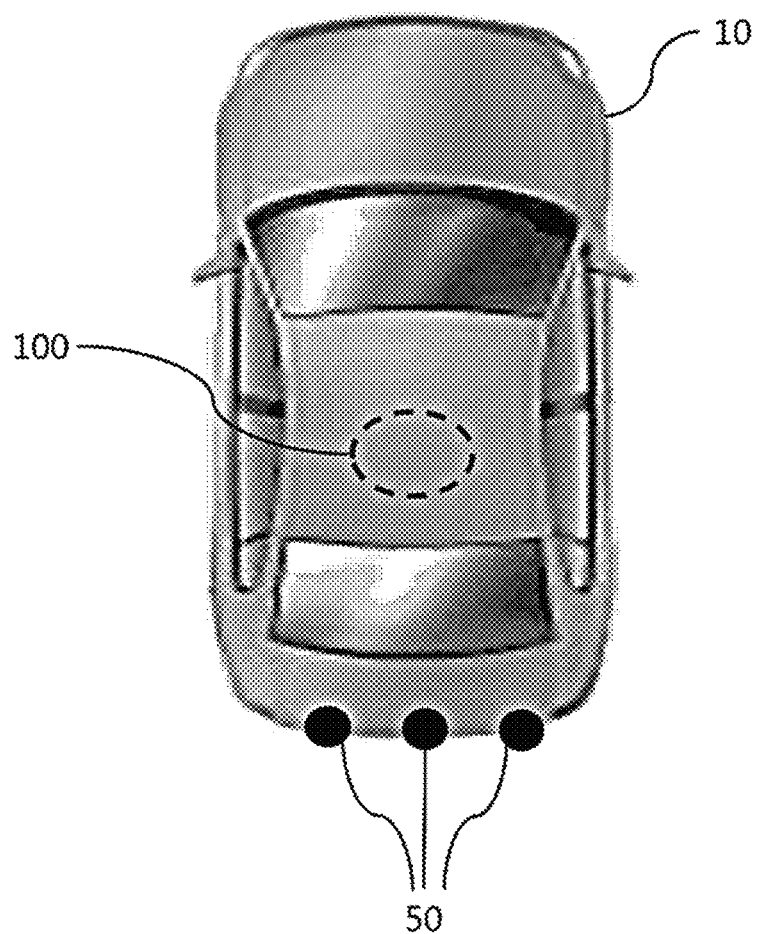
FIG. 1 shows a vehicle according to an embodiment of the disclosure.

Reference will now be made in detail to the preferred embodiments of the disclosure, examples of which are illustrated in the accompanying drawings. In the drawings, the same elements are denoted by the same reference numerals, and a repeated explanation thereof will not be given. The suffixes "module" and "unit" of elements herein are used for convenience of description and thus can be used interchangeably and do not have any distinguishable meanings or functions.

The terms "a" or "an", as used herein, are defined as one or more than one. The term "another", as used herein, is defined as at least a second or more. The terms "including" and/or "having" as used herein, are defined as comprising (i.e. open transition). The term "coupled" or "operatively coupled" as used herein, is defined as connected, although not necessarily directly, and not necessarily mechanically.

In the description of the disclosure, certain detailed explanations of related art are omitted when it is deemed that they may unnecessarily obscure the essence of the disclosure. The features of the disclosure will be more clearly understood from the accompanying drawings and should not be limited by the accompanying drawings. It is to be appreciated that all changes, equivalents, and substitutes that do not depart from the spirit and technical scope of the disclosure are encompassed in the disclosure.

FIG. 1 shows a vehicle according to an embodiment of the disclosure.

As shown, a vehicle 10 can provide a notification to a driver after generating information about a specific sound, such as what kind of sounds occurs adjacent to the vehicle 10 while driven by the driver, which direction it comes from, and the like.

The vehicle 10 can include a multi-channel microphone 50 configured to collect a sound outside the vehicle 10 and a sound tracking apparatus 100 configured to generate information about a specific sound based at least on a sound data collected by the multi-channel microphone 50. Each microphone of the multi-channel microphone 50 can be considered a single channel. By the way of example but not limitation, there are 3 microphones of the multi-channel microphone 50. Though plural locations of microphones in the vehicle 10 are shown in FIG. 1, the locations can be changed.

Figure 2:
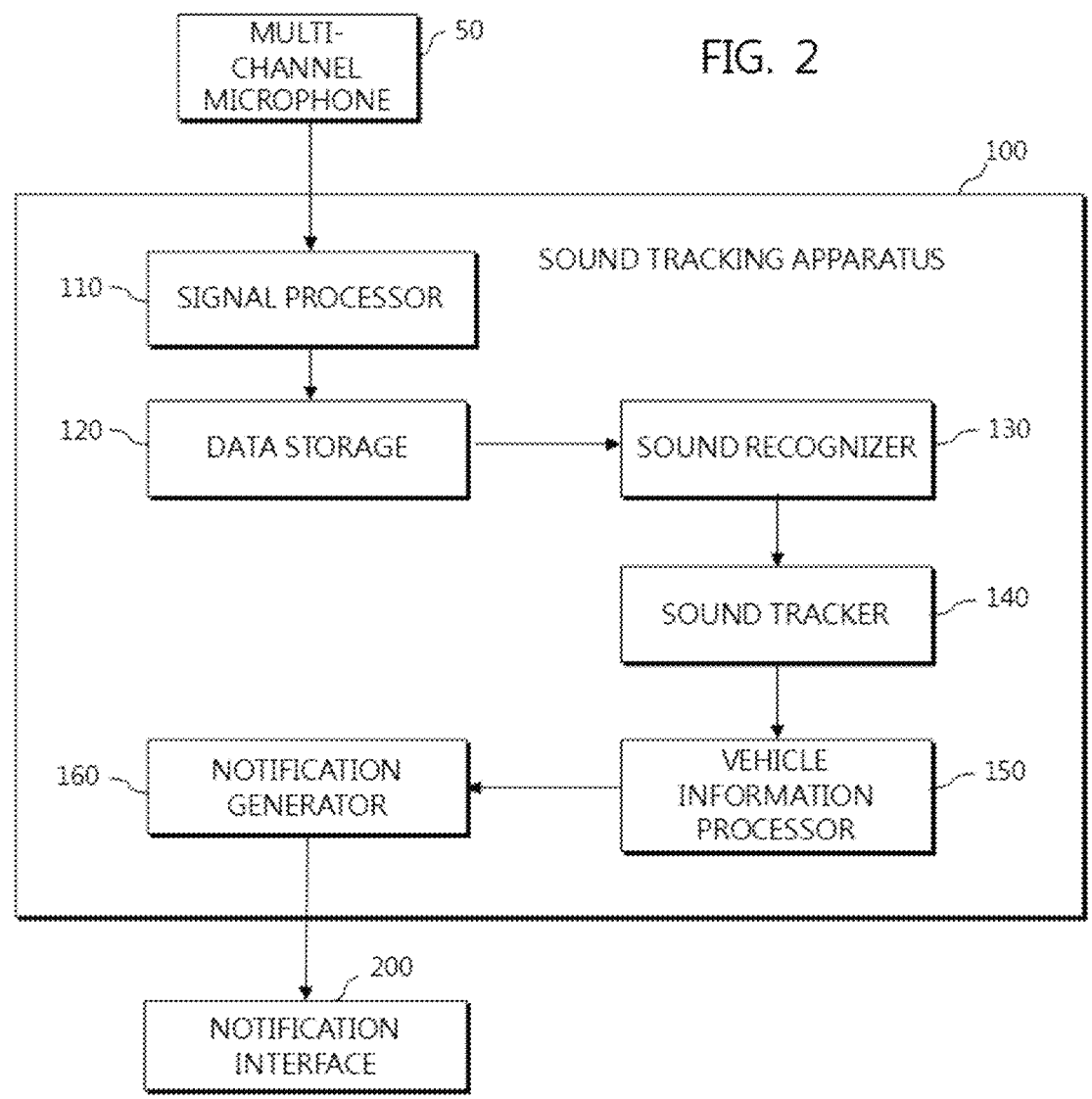
FIG. 2 shows a sound tracking apparatus shown in FIG. 1.

Referring to FIG. 2, detailed configurations of the sound tracking apparatus 100 are described.

FIG. 2 shows the sound tracking apparatus 100 shown in FIG. 1.

As shown, the sound tracking apparatus 100 can include a signal processor 110, a data storage 120, a sound recognizer 130, a sound tracker 140, a vehicle information processor 150, and a notification generator 160. By the way of example but not limitation, the sound tracking apparatus 100 can be designed to be equipped within a head unit of the vehicle 10.

The multi-channel microphone 50 can detect a sound occurred adjacent to the vehicle 10 to generate a sound data regarding the sound through an analog-digital conversion, and deliver the sound data into the signal processor 100.

There are various types of sounds lying near, or close to, a vehicle. For example, there are engine sounds coming from other vehicles near the vehicle, sibilant voices from rear tires, sounds made by traffic signs, electric signs or the like, sounds of nature, and so on.

A driver, while driving the vehicle 10, would like to know a status and a relational location of another vehicle which could run at a blind area in forward, backward and sideward of the vehicle 10. Herein, the status can include whether another vehicle tries to pass the vehicle 10.

Some of sounds existing outside the vehicle 10 could not be delivered into a driver because of an in-vehicle sound insulation system. Accordingly, when a warning horn sound is heard, the driver would like to know which direction the warning horn sound comes from or whether the warning horn sound is relevant to the vehicle 10. By properly recognizing the warning horn sound, the driver can slow down the vehicle, change a lane of road, turn on an emergency lamp, or the like.

Further, when turning up the volume of in-vehicle audio system, the driver could not catch or hear a warning horn sound near the vehicle. In this case, it might be necessary to acoustically or visually inform the driver of an event that a warning horn sound occurs nearby the vehicle via an in-vehicle audio system.

A driver can be interested in another sound. For example, when a vehicle is stopped suddenly, a loud frictional sound can be generated because of a friction between the ground and tires. The loud frictional sound can be relevant to a car accident or a near car accident so that it could be required to caution the driver. For another example, a bang occurs when a vehicle collides with another vehicle. If a bang occurred on the front, the side or the like of a vehicle could be recognized as well as direction information about where the bang occurs is provided to the driver, another subsequent car accident/clash could be avoided.

When there is a loud prolonged signal or a warning sound made by a siren equipped in an ambulance or a police car nearby, close to, a vehicle, a driver should move the vehicle in order that the ambulance or the police car can pass the vehicle. In a particular situation, if the driver would not do required actions, he or she can face legal punishment. Accordingly, it could be useful that a vehicle helps a driver to recognize a loud prolonged signal or a warning sound coming from an emergency vehicle or a government-operated vehicle.

The signal processor 110 can perform a noise filtering against delivered sound data. Various noises, which are difficult to understand a characteristic or a source of sounds, can be removed by the noise filtering. Most of driver's interested sounds such as a warning horn sound, a siren sound, a loud frictional sound, a bang and the like can have a sufficiently high decibel (dB) level, e.g., over 70 dB. Thus, the signal processor 110 can determine whether a sound data after a noise removed has a higher decibel level than, or equal to, a reference level. That is, the sound data having a lower a decibel level than the reference level can be deleted by the signal processor 110.

The data storage 120 can store the sound data of which a noise is removed. The data storage 120 can store the sound data as a unit of a frame, and provide the sound data into the sound recognizer 130. For the way of example but not limitation, the frame can include plural sound data collected at a particular same timing, and an interval between each of frames can be a specific constant time (e.g., 40 ms, 100 ms, etc.).

The sound recognizer 130 can analyze characteristics of sound data. Even if having a higher decibel level than the reference level, the sound data might be not important to a driver. For example, though sounds coming from a train, sounds coming from flights near an airport or the like can have a higher decibel level, those sounds might not affect the driver taking the wheel. Noises occurring in a road recovery, a republishing project, etc., are the same. If these sounds are informed a driver continuously, it is likely that driver's response becomes slow or does not exist in a case when the driver should pay attention.

Regarding the sound data delivered from the data storage 120, the sound recognizer 130 can extract particular values in both a time domain and a frequency domain. The sound recognizer 120 can build a database including an average value and a variation value of the particular values. Herein, the particular values can include Mel-Frequency Cepstral Coefficients (MFCCs), a Total Spectrum Power (TSP), a Sub-band Spectrum Power (SSP), and/or a pitch frequency. The sound recognizer 120 can store an average value and a variation value of a predetermined time period (e.g., a frame of 100 ms) about the sound data in the database.

In a technical field of sound signal processing, Mel-Frequency Cepstrum (MFC) is one of methods representing a short-term power spectrum of a sound. The MFC can be obtained based on a linear cosine transform of a log power spectrum on a nonlinear Mel scale of frequency. Mel-frequency cepstral coefficients (MFCCs) are coefficients that collectively make up an MFC. Generally, MFCCs uses a pre-emphasis filter for a short-term sound data (signal), and then applies Discrete Fourier Transform (DFT). In MFCCs, a power spectrum can be obtained by Mel Filter Banks, and logarithm is used to the power spectrum. Then, MFCCs can be obtained by applying Discrete Cosine Transform (DCT) to the logarithm value.

The power spectrum can show an energy distribution in a predetermined frame, and the sub-band spectrum power can describes energy distribution values in generally four sub-band spectrums such as $[0, \frac{1}{8}f0]$, $[\frac{1}{8}f0, \frac{1}{4}f0]$, $[\frac{1}{4}f0, \frac{1}{2}f0]$ and $[\frac{1}{2}f0, f0]$. The pitch frequency can be obtained based at least on an autocorrelation function. Herein, pitch can be the fundamental frequency of an audio waveform and is a parameter in the analysis of sounds such as speech and music signals, and the pitch frequency can be estimated by the reciprocal of the time period between the original and the first valley on an average magnitude different function (AMDF) curve. After estimating the pitch frequency for sound data, pitch contour (PC), pitch standard deviation (PSTD), smooth pitch ratio (SPR) and non-pitch ratio (NPR) can be some effective features for classifying the sound data into different categories.

The sound recognizer 130 can use a classifier configured to classify characteristic values about the sound data obtained by above described methods to recognize whether the sound data includes a specific sound which a driver would be interested in. The classifier can include one of a neural network classifier, a Support Vector Machine (SVM), and a Bayesian classifier.

Hereinafter, an example where the sound recognizer 130 uses the neural network classifier is described.

The classifier of the sound recognizer 130 can classify a sounds as plural classes based on a type of sounds, and use the characteristic values regarding the obtained sound data to estimate or calculate a confidence level of the sound data based at least on a similarity between the sound data and the plural classes. That is, the confidence level includes a probability that the sound data can be categorized as a specific class. The total summation of the confidence level can be one.

A sound classification result generated by the classifier of the sound recognizer 130 can include information about each class, a type of sound corresponding to each class, and a confidence level corresponding to each class.

The sound recognizer 130 can determine whether the confidence level of the sound data is equal to, or larger than, a threshold (e.g., 0.7), and add a determination result into the sound classification result. That is, in a case when the confidence level is equal to, or larger than, the threshold, the sound recognizer 130 can determine a specific class corresponding to the confidence level as a type of sound data.

Accordingly, the sound recognizer 130 can analyze characteristics of sound data to generate a sound classification result considered information about which type of sounds the sound data is.

Regarding a type of sound (or a target sound) having a confidence level being higher than the threshold of a specific class, which is categorized as a specific class, the sound tracker 140 can track a sound direction, i.e., where a sound comes from, based at least on the sound data. The type of sound can be provided by the sound recognizer 130.

The sound tracker 140 can accumulate sound data included in consecutive frames, recognize a similarity of sound entered via each microphone in a waveform (with sound's time characteristic), and measure a difference between timings of receiving the sound data via each of microphones. The sound's time characteristic can be provided by the sound recognizer 130.

The volume of the sound is in inverse proportion to the squared distances. When a distance is double far from a location where a sound occurs, the volume of the sound can decrease by ¼ (approximately 6 dB). In a case that it is assumed that a typical vehicle has a width of about 2 m and a length of about 3 m, a difference between volumes of detected sounds (sound data) can be useful information based on the location where the sound occurs.

For the way of example but not limitation, when the multi-channel microphone 50 is equipped in a vehicle shown in FIG. 1, if a sound occurs at an upper right of the vehicle, a volume of sound detected by a microphone arranged at an upper of the vehicle is larger than those detected by microphones arranged at lower right and left of the vehicle. In addition, a volume of sound detected by the microphone arranged at lower right of the vehicle is larger than that detected by the microphone arranged at lower left of the vehicle.

Based at least on those characteristics, volumes of sounds collected from each of microphones can be used for tracking a general direction on a subject vehicle basis.

Further, a difference between timings of receiving a sound via each of microphones (e.g., signal delay) can be used for measuring an angle about a position where the sound occurs. The sound tracker 140 stores table/matrix type data containing mapping information between the angle about a position where the sound occurs and a signal delay corresponding to each of microphones. For the way of example but not limitation, in the table/matrix type data, an one degree is associated with a predetermined first time t1 (a signal delay for a first microphone), a predetermined second time t2 (a signal delay for a second microphone), and a predetermined third time t3 (a signal delay for a third microphone). Further, a probability that a tracking target is placed at the one degree can be estimated by the summation of values obtained by applying signal delays t1, t2, t3 to sound data stored in the data storage 120, which is collected via each of microphones.

That is, delay values for each of all angles can be applied to a current signal (sound data) so as to measure a probability that a tracking target is placed at each degree. Accordingly, a location/position where a sound occurs can be estimated. It is because each combination of an angle about the location/position where the sound occurs and a signal delay corresponding to each of microphones can be one to one correspondence with each other.

Using that information, the sound tracker 140 can generate the sound tracking information for each angle relative to the vehicle 10 in consecutive frames.

The sound tracking information can include a probability of whether there is an object (e.g., another vehicle) at each angle, which is matched with a target sound in each frame continued according to a time.

Hereinafter, it can be assumed that an apparatus can collect only a fricative sound around a subject vehicle (e.g., sibilant voices coming from tires). In this case, a sound tracking information based at least on detected/collected fricative sounds in each frame continued according to a time can include a probability of whether there is another vehicle near to, and each angle relative to, the subject vehicle 10.

The vehicle information processor 150 can detect probabilities of other vehicles at every angle from the sound tracking information, as well as other information including presence of other vehicles, the number of other vehicles, degree of risk from each of other vehicles, angles of other vehicles' locations, and so on.

The vehicle information processor 150 can deliver the probabilities of other vehicles and other information as a detection signal into the notification generator 160.

The notification generator 160 can generate the notification including information about other vehicles close to the subject vehicle.

The notification interface 200 can deliver, into a driver, information about a location where a sound occurs based at least on the notification provided by the sound tracking apparatus 100. For the way of example but not limitation, the notification interface 200 can acoustically, visually or both provide the information to the driver.

The notification interface 200 can be implemented in a Head Unit Display (HUD) or a cluster equipped in the vehicle 10, so as to provide visual information about a location where a sound occurs. Further, the notification interface 200 can be implemented in a navigation device coupled with the sound tracking apparatus 100 via a wired communication network such as a Controller Area Network (CAN) bus or the like. Further, the notification interface 200 can be included in in a smart device, such as a smartphone, a tablet, a smartwatch or the like, coupled with the sound tracking apparatus 100 via a short-range wireless technology such as BLUETOOTH, NFC, Wi-Fi or the like.

Figure 3:
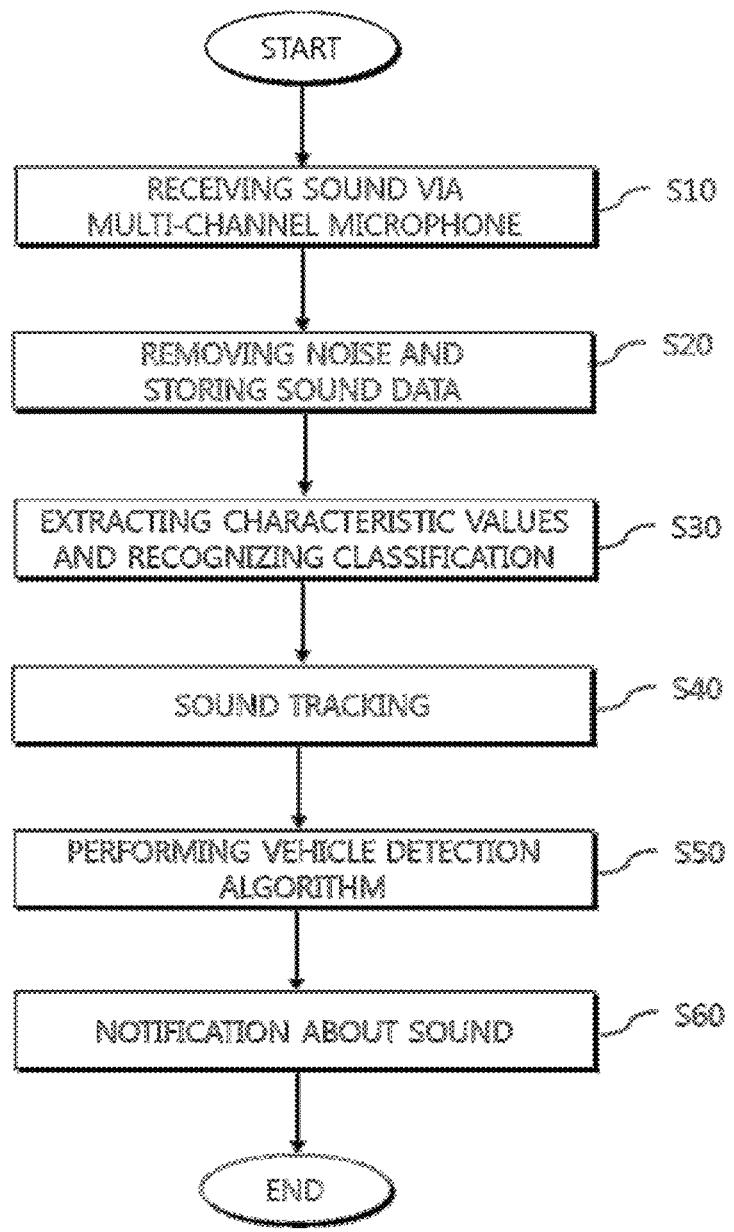
FIG. 3 describes an operation method of tracking sound based on the apparatus shown in FIG. 2.
Figure 4:
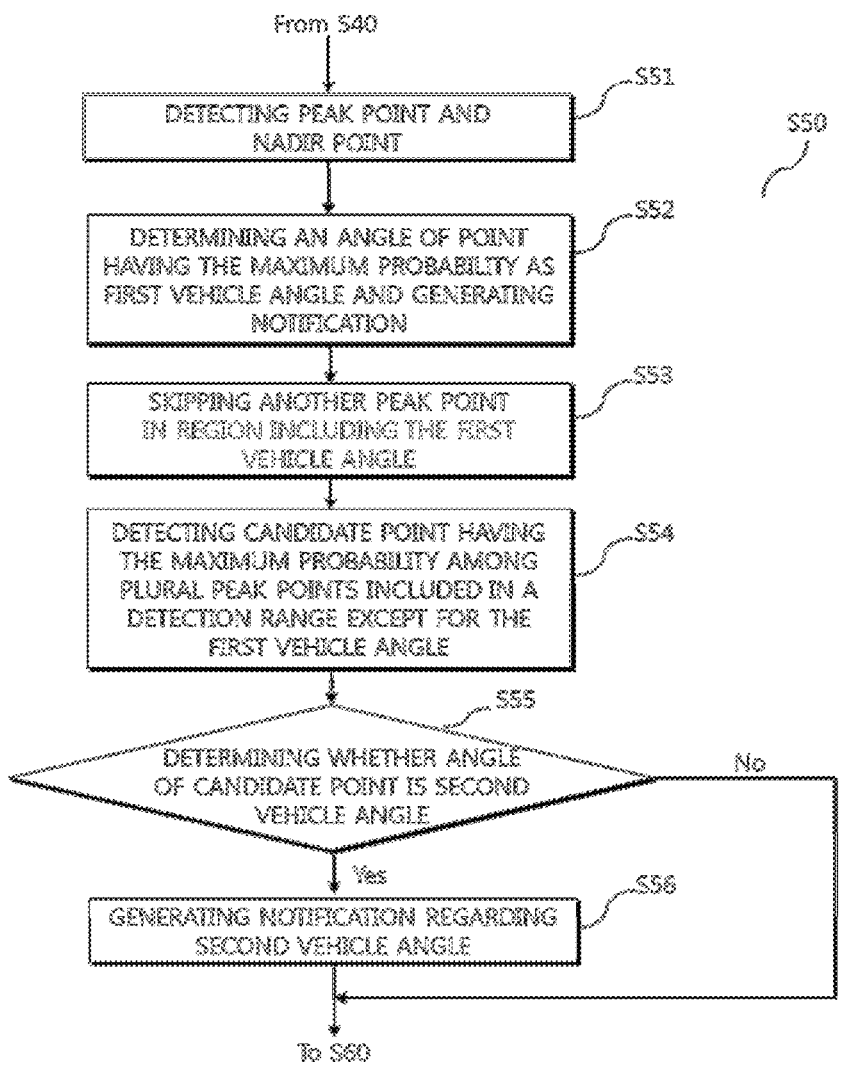
FIG. 4 shows step S50 shown in FIG. 3.
Figure 5:
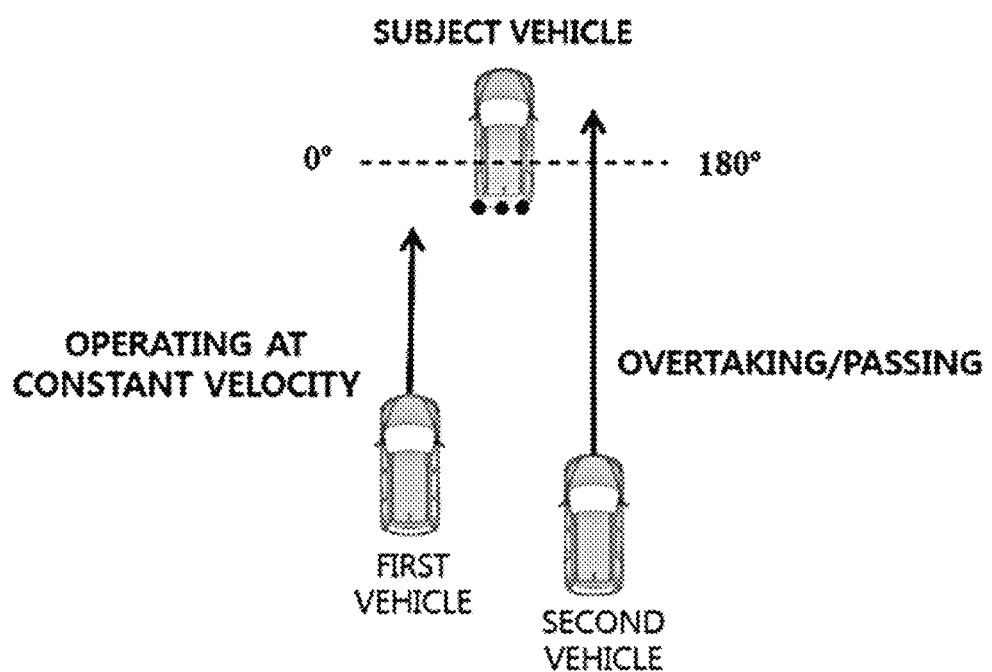
FIGS. 5 and 6 describe an example when a subject vehicle detects plural other vehicles operating near the subject vehicle.
Figure 6:
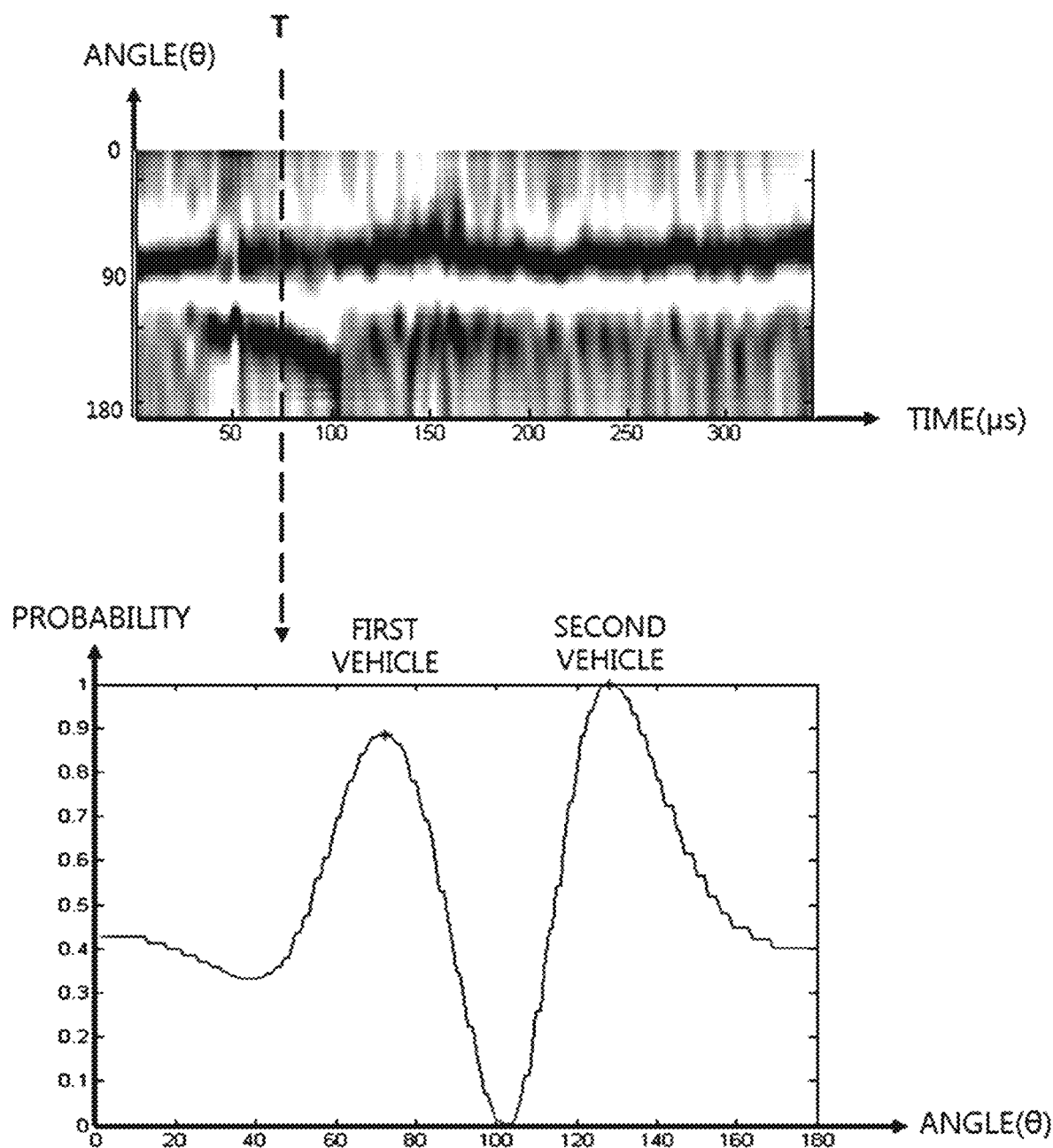
Figure 7:
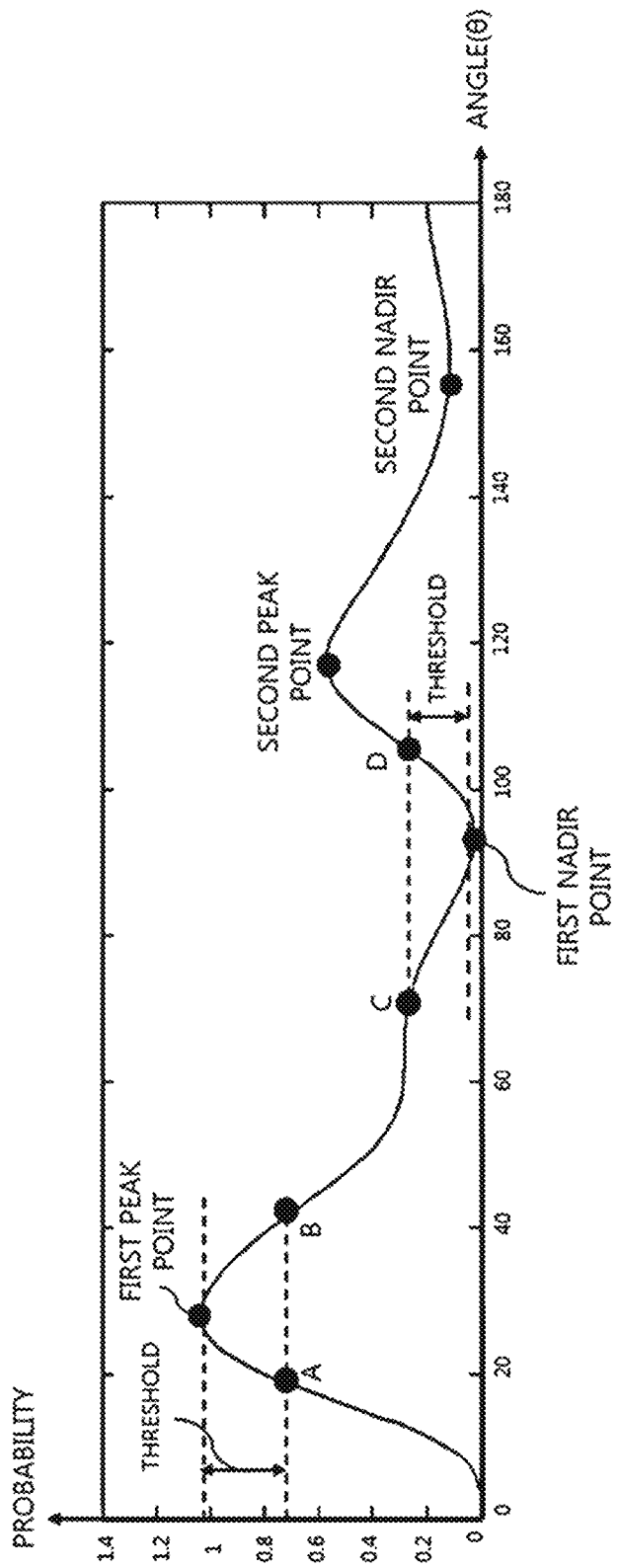
FIG. 7 describes an example of how to detect a peak point and a nadir point.
Figure 8:
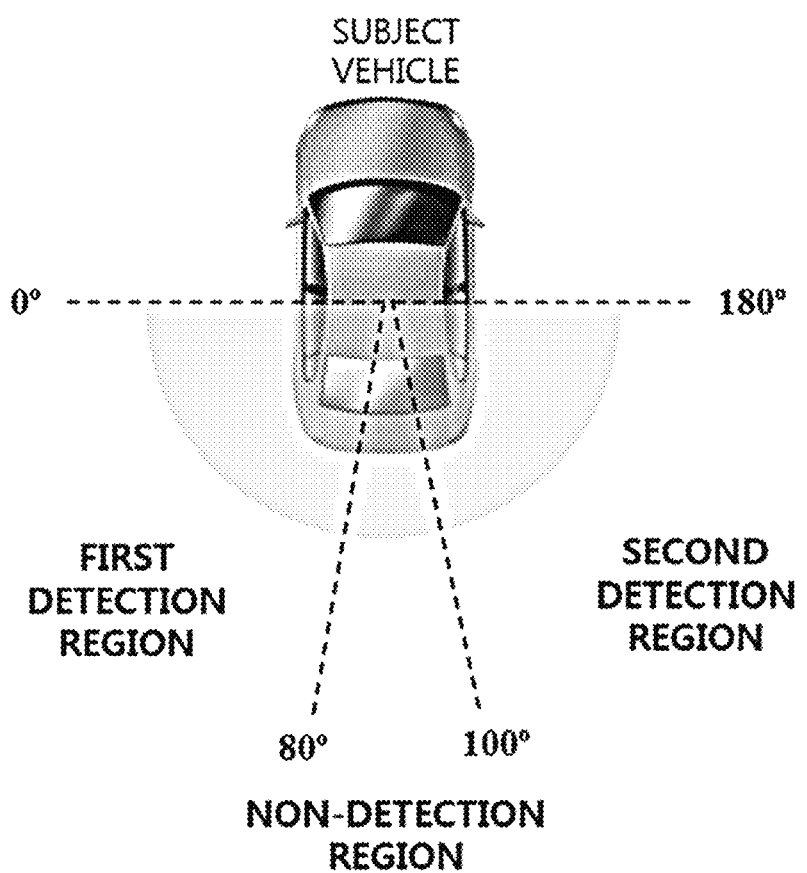
FIG. 8 describes an example of how to split a rearward area of the subject vehicle.
Figure 9:
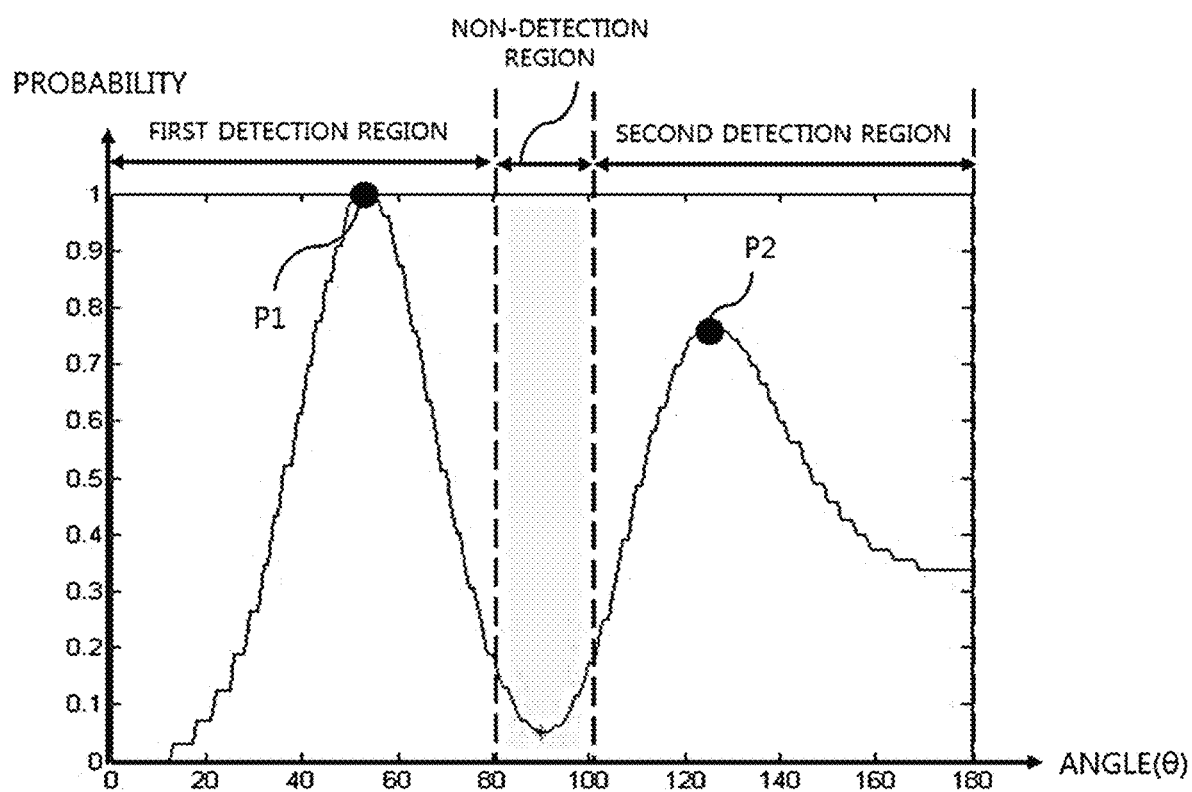
FIGS. 9 and 10 show how to detect a first vehicle angle and a second vehicle angle from a first detection region and a second detection region.
Figure 10:
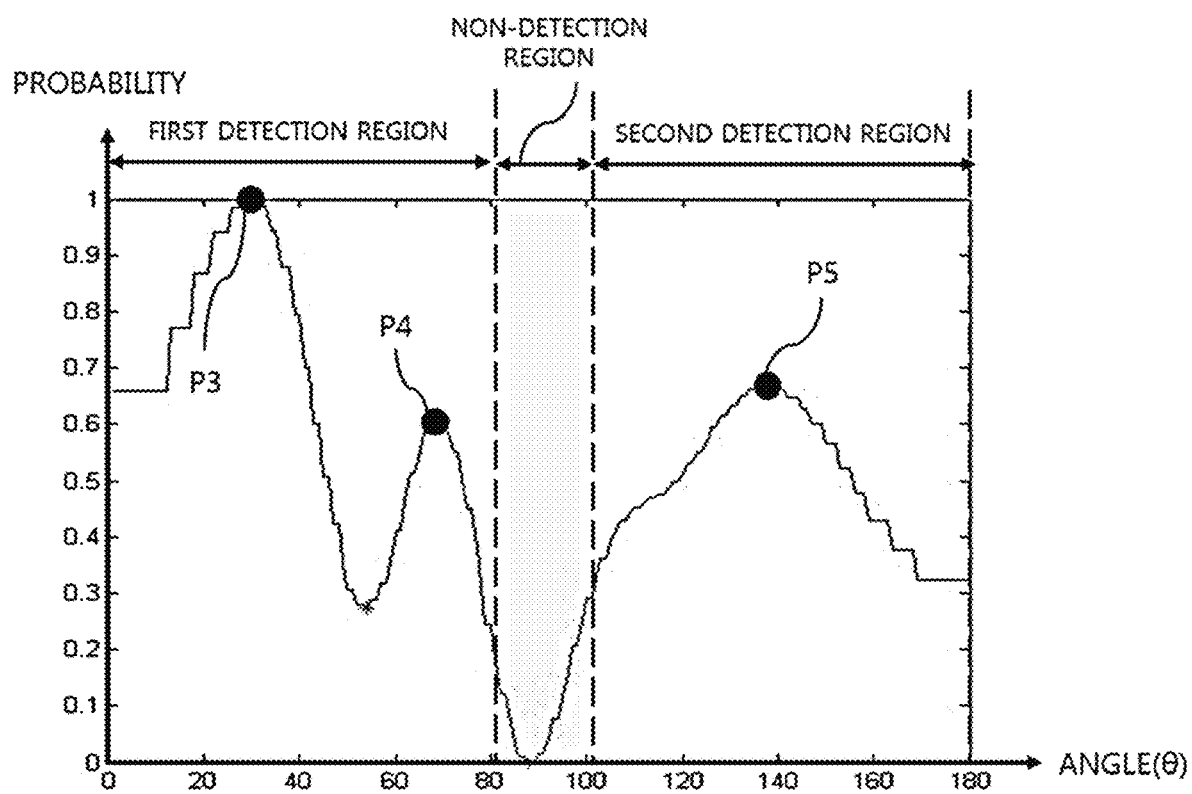
Figure 11:
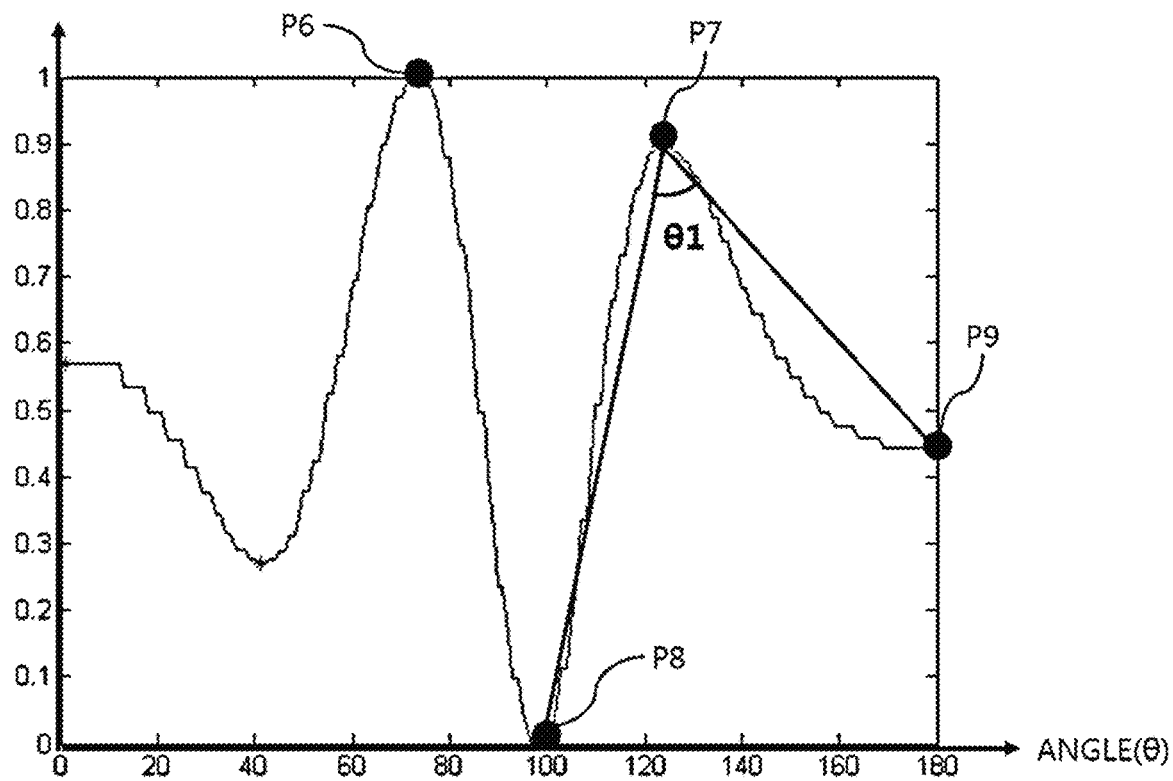
FIGS. 11 and 12 describe how to determine the second vehicle angle.
Figure 12:
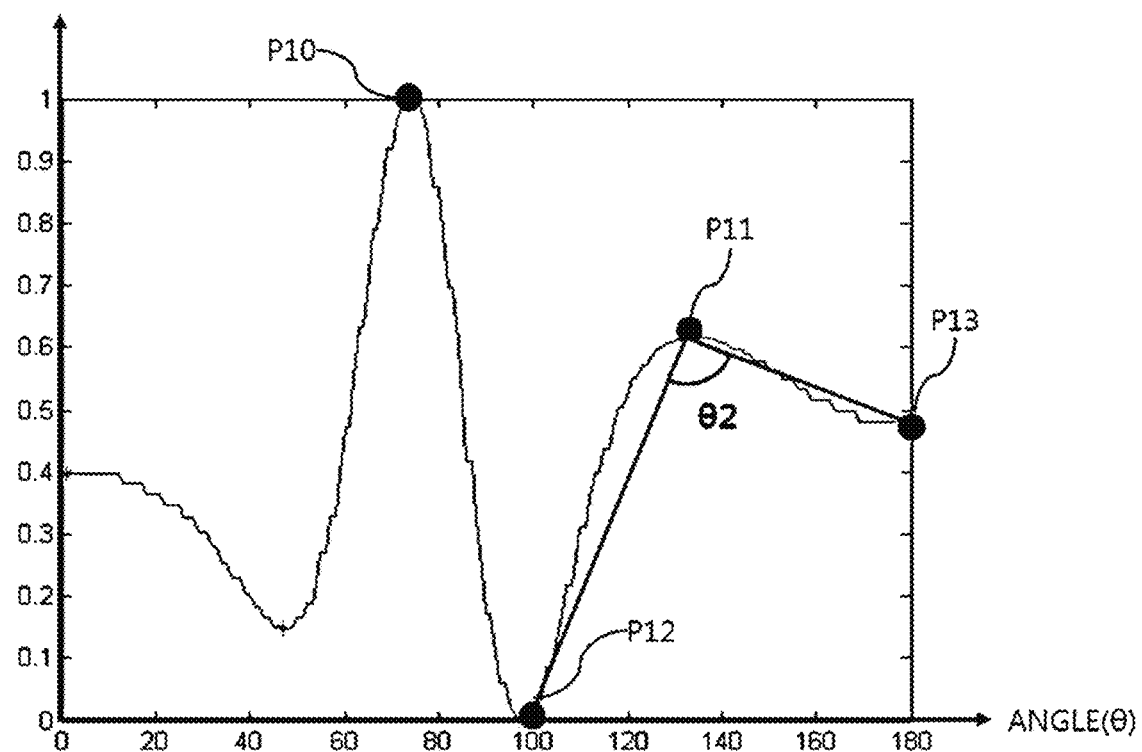

FIG. 3 describes an operation method of tracking sound based on the apparatus shown in FIG. 2. FIG. 4 shows step S50 shown in FIG. 3. FIGS. 5 and 6 describe an example when a subject vehicle detects plural other vehicles operating near the subject vehicle. FIG. 7 describes an example of how to detect a peak point and a nadir point. FIG. 8 describes an example of how to split a rearward area of the subject vehicle. FIGS. 9 and 10 show how to detect a first vehicle angle and a second vehicle angle from a first detection region and a second detection region. FIGS. 11 and 12 describe how to determine the second vehicle angle.

Referring to FIG. 3, the operation method executed by the sound tracking apparatus 100 shown in FIG. 2, i.e., a method for providing sound tracking information, is described.

The signal processor 110 can detect sounds occurred adjacent to a subject vehicle 10 and receive a sound data generated through an analog-digital conversion of the sounds (S10).

The signal processor 110 can perform a noise filtering against the obtained sound data, and the data storage 120 can store the sound data of which noise is removed (S20).

The sound recognizer 130 can extract or abstract characteristic values, in a time domain and a frequency domain, from the sound data delivered from the data storage 120, and use a classifier to classify the characteristic values so as to generate a sound classification result (S30).

Regarding a type or a class of sounds having a higher confidence level than a threshold, based at least on the sound data, the sound tracker 140 can generate information about a probability of whether an object or a target corresponding to the type or the class of sounds exists at each angle in each frame continued according to a time (S40).

The vehicle information processor 150 executes a vehicle detection algorithm so that information regarding other vehicles can be detected from probabilities of other vehicles' presence at every angle, which is included in the sound tracking information (S50).

The vehicle detection algorithm is a kind of processes for detecting at least one another vehicle from the sound tracking information.

Referring to FIG. 5, it is assumed that the subject vehicle 10 operates at constant velocity, a first vehicle located in left rear region of the subject vehicle 10 also operates at constant velocity (which is similar to a speed of the subject vehicle 10), and a second vehicle placed in right rear region of the subject vehicle 10 tries to overtake the subject vehicle 10. Further, assuming that a left side (direction) of the subject vehicle 10 is 0 degree while a right side (direction of the subject vehicle 10 is 180 degree, a rear region of the subject vehicle 10 can be specified by angles of 0 to 180 degrees.

FIG. 6 shows a first graph describing a sound tracking result, according to a time, generated by the sound tracker 140 in a case when the subject vehicle operates under the circumstance shown in FIG. 5. In the graph, as darker, there is a higher probability of whether another vehicle exists at each angle. An X-axis of the graph is a time (μs), and a Y-axis is an angle (θ).

The graph shows that the second vehicle approaches the subject vehicle 10 from a right rear region (i.e., at about 120 degree) at about 30 μs, and passes the subject vehicle from the right at about 100 μs.

FIG. 6 shows another graph describing a relationship between a probability and an angle (θ) of a frame corresponding to a specific time (T: about 70 μs) in the first graph showing a sound tracking result.

In this graph, there are plural other vehicles, i.e., the first and the second vehicles, from left and right rear regions of the subject vehicle 10. The vehicle detection algorithm can recognize information regarding other vehicles, including presence of the first and the second vehicles, the number of the first and the second vehicles, degree of risk from each of the first and the second vehicles, location angles of the first and the second vehicles, and so on.

FIG. 4 shows the step (S50) about the vehicle detection algorithm. The vehicle detection algorithm can be executed every frame included in the sound tracking result. Hereinafter, the sound tracking result can indicate a single frame of the sound tracking result.

The vehicle information processor 150 can detect at least one peak point and at least one nadir point in a sound tracking result (S51).

When a particular frame included in the sound tracking result is shown in FIG. 7, how the vehicle information processor 150 can detect a peak point and a nadir point is described hereinafter.

The vehicle information processor 150 can detect an inflection point where a direction of probability curvature is changed, e.g., increase to decrease and vice versa. Plural inflection points can be assigned as a first peak point, a second peak point, a first nadir point and a second nadir point.

The vehicle information processor 150 can recognize an angle range between two angles having a value different from a peak or nadir point by a threshold value, and another peak (or another nadir) point within the angle range including the peak (or nadir) point. For example, when the inflection point is a peak point, the angle range having a higher probability than a value subtracting the threshold value from the peak point is between two angles, i.e., two closest points from the peak point, having the value subtracting the threshold value from the peak point.

For example, based on the first peak point, the vehicle information processor 150 can determine whether there is another peak point within an angle range between a first point A, before the first peak point, corresponding to a value subtracting the threshold value from a probability of the first peak point and a second point B, after the first peak point, corresponding to a value subtracting the threshold value from the probability of the first peak point.

Further, based on the first nadir point, the vehicle information processor 150 can determine whether there is another nadir point within another angle range between a third point C, before the first nadir point, corresponding to a value adding the threshold value into a probability of the first nadir point and a fourth point D, after the first nadir point, corresponding to a value adding the threshold value into the probability of the first peak point.

If another peak or nadir point appears within a predetermined angle range including a peak or nadir point, the another peak or nadir point may be an error detection (e.g., plural peak and nadir points within a narrow angle range), as compared with distribution of probability regarding other vehicles at every angle.

In FIG. 7, since there is no another peak nor nadir point within an angle range including the first peak or nadir point (i.e., the first peak or nadir point is a unique point within the angle range), the vehicle information processor 150 can consider the first peak point and the first nadir point the maximum point and the minimum point respectively. likewise, in another angle range having a higher or lower probability than a value subtracting/adding the threshold value from/into the second peak or nadir point, there is no another peak or nadir point so that the vehicle information processor 150, determining there is no error detection, can consider the second peak point and the second nadir point the maximum point and the minimum point, respectively. Finally, the vehicle information processor 150 can determine the first and second peak points as the maximum point, and the first and second nadir points as the minimum point.

Herein, the threshold value regarding peak points can be same with or different from the threshold value regarding nadir points. Further, the threshold value may be 0.3, but can be a predetermined value which can be obtained or determined experimentally.

Further, when detecting plural peak points, the vehicle information processor 150 may not recognize a peak point having a lower probability than a predetermined value (e.g., 0.6). When a probability of peak point is a higher than the predetermined value, a reliability could be secured. If a peak point has a lower probability than the predetermined value, it might be unnecessary to determine whether the peak point can be considered a first vehicle angle or a second vehicle angle which is described later.

The vehicle information processor 150 can determine an angle having the maximum probability among plural peak points as a first vehicle angle. It can be presumed that the first vehicle angle is an angle of where another vehicle having a relatively higher degree of risk is placed on from the subject vehicle.

A probability shown in FIG. 7 can increase as sibilant voices presumed to come from tires becomes louder because the sound tracking result reflects a level of sibilant voices. Assuming that sibilant voices occurring on a road are similar regardless of a type of vehicles, sibilant voices from another vehicle can increase as a distance between the subject vehicle and another vehicle becomes closer. Accordingly, the probability can be relevant to the distance between the subject vehicle and another vehicle. Thus, the degree of risk can be considered an indicator showing a relative distance between the subject vehicle and another vehicle, and the maximum point having the maximum probability can have a higher degree of risk.

For example, since the first peak point shown in FIG. 7 has the maximum probability, the vehicle information processor 150 can determine an angle of the first peak point as the first vehicle angle.

The vehicle information processor 150 can deliver information regarding another vehicle, including presence of another vehicle at the first vehicle angle, a higher degree of risk of another vehicle, etc., into the notification generator 160 (S52).

Referring to the minimum point having the minimum probability among plural recognized nadir points, the vehicle information processor 150 can split a rear region of the subject vehicle (0 to 180 degree) into plural regions.

As shown in FIG. 8, assuming that the first nadir point having the minimum probability between the first and the second nadir points is 90 degree, the vehicle information processor 150 can determine an angle range from 80 degree, which is 10 degree before 90 degree, to 100 degree which is 10 degree after 90 degree, as a non-detection region. The non-detection region can include a region where there is a lower probability of another vehicle presence among the rear region of the subject vehicle (0 to 180 degrees). Typically, the non-detection region may be arranged adjacent to 90 degree.

Herein, by the way of example but not limitation, the non-detection region includes an angle range of 20 degrees.

Further, the vehicle information processor 150 can determine a region before the non-detection region (i.e. an angle range of 0 to 80 degrees) as a first detection region, while determining a region after the non-detection region (i.e., an angle range of 100 to 180 degrees) as a second detection region.

The vehicle information processor 150 can determine which detection region between the first and the second detection regions includes the first vehicle angle, and skip or block generation of detection signal about another peak point within the corresponding detection region (S53). Herein, the skipping or blocking process can omit whether another peak point can be considered a second vehicle angle and whether a detection signal regarding another peak pint should be generated.

Referring to FIG. 9, because a first point P1 corresponding to the first vehicle angle having the maximum probability is within the first detection region, the vehicle information processor 150 can determine whether another peak point is included in the first detection region. If there is no another peak point in the first detection region, the vehicle information processor 150 can execute the next step (S54).

Referring to FIG. 10, since a third point P3 corresponding to the first vehicle angle having the maximum probability is within the first detection region, the vehicle information processor 150 can determine whether another peak point is included in the first detection region. When a fourth point P4 as another peak point exists in a situation shown in FIG. 10, the vehicle information processor 150 can skip or block generation of detection signal about the fourth point P4 within the first detection region.

The vehicle information processor 150 can detect another maximum point (or candidate point) having the maximum probability among plural peak points included in other detection regions which do not include the first vehicle angle (S54).

In FIG. 9, the vehicle information processor 150 can detect the second point P2 as the maximum point having the maximum probability among plural peak points within the second detection region which does not include the first point P1 corresponding to the first vehicle angle.

If there are the second point P2 as well as other peak points in the second detection region, a point having the maximum probability among the second point P2 and the other peak points can be determined as the maximum point.

In FIG. 10, the vehicle information processor 150 can detect a fifth point P5 as the maximum point having the maximum probability among peak points within the second detection region which does not include the third point P3 corresponding to the first vehicle angle.

If there are the fifth point P5 as well as other peak points in the second detection region, a point having the maximum probability among the fifth point P5 and the other peak points can be determined as the maximum point.

Actually, it is possible that plural other vehicles can exist in either the first detection region or the second detection region. However, if plural vehicles are detected in a single detection region (e.g., a left rear region or a right rear region) and their information is provided, providing this information can cause driver's confusion practically so that a driving safety may not be secured.

Meanwhile, in another embodiment, the vehicle information processor can be configured to detect the maximum point in either the first detection region or the second detection region as well as the second maximum point therein so as to generate a detection signal regarding the maximum point as well as the second maximum point.

The vehicle information processor 150 can determine whether an angle of the maximum point detected within a detection region which does not include the first vehicle angle is considered a second vehicle angle (S55). The second vehicle angle can be presumed as an angle of where another vehicle having a relatively lower degree of risk than the vehicle placed at the first vehicle angle exists. Since the first vehicle angle has the maximum probability reflecting a distance between the subject vehicle and another vehicle within the corresponding frame, the degree of risk at the second vehicle angle can be considered lower than that at the first vehicle angle because of a lower probability than the first vehicle angle.

There can be a lot of ways of how the vehicle information processor 150 determines whether an angle of the maximum point detected in a detection region which does not include the first vehicle angle is considered a second vehicle angle. Herein, two different examples are explained.

These two examples are for estimating a degree of kurtosis in a probability pattern adjacent to the maximum point. When another vehicle operates at a predetermined angle, a probability pattern can have a kurtosis (value) near the predetermined angle.

Referring to FIG. 11, in a first method, a first vehicle angle is an angle of a sixth point P6 having the maximum probability while another peak point is a seventh point P7 having the maximum probability detected in a detection region after a non-detection region placed on about 100 degree.

The vehicle information processor 150 can detect a first nadir point having the lowest probability before the seventh point P7 and a second nadir point having the lowest probability after the seventh point P7. Herein, if there is no nadir point having the lowest probability before or after the seventh point P7, a beginning or ending angle (i.e., 0 or 180 degree) can be assigned as the first or second nadir point.

In FIG. 11, the vehicle information processor 150 can detect an eighth point P8 as the first nadir point having the lowest probability before the seventh point P7, and an ninth point P9 corresponding to an ending angle (180 degree) as the second nadir point because there is no nadir point having the lowest probability after the seventh point P7.

The vehicle information processor 150 can be configured to determine the seventh point P7 as an intersecting point, to make two intersecting lines including one from the seventh point P7 to the eighth point P8 and the other from the seventh point P7 to the ninth point P9, and to measure an angle $\theta 1$ between the two intersection lines.

By the way of example but not limitation, the angle can be measured by combining an angle obtained from a relative distance and difference values of x-axis or y-axis between the seventh point P7 and the eighth point P8 and another angle obtained from a relative distance and difference values of x-axis or y-axis between the seventh point P7 and the ninth point P9.

The vehicle information processor 150 can compare the angle $\theta 1$ with a predetermined threshold angle so as to determine whether the angle $\theta 1$ is equal to or smaller than the predetermined threshold angle.

When the angle $\theta 1$ is equal to or smaller than the predetermined threshold angle, the vehicle information processor 150 can determine an angle of the seventh point P7 corresponding to the angle $\theta 1$ as a second vehicle angle.

When the angle $\theta 1$ is larger than the predetermined threshold angle, the vehicle information processor 150 can determine that the angle of the seventh point P7 is not the second vehicle angle.

Herein, the threshold angle is a sort of criterion to determine whether the angle of the seventh point P7 is the second vehicle angle. The threshold angle can be determined experimentally. Further, the threshold angle can be adjusted according to scales of probability (y-axis) and angle (x-axis). For example, the threshold angle can be a 60 degree.

The angle $\theta 1$ shown in FIG. 11 is about 55 degree, so that the vehicle information processor 150 can determine the angle of the seventh point P7 as the second vehicle angle.

Referring to FIG. 12, a first vehicle angle is an angle of a tenth point P10 having the maximum probability, and another peak point is an eleventh point P11. The eleventh point P11 has the maximum probability in a detection region after a non-detection region near an angle (about 100 degree) of nadir point having the minimum probability.

The vehicle information processor 150 can detect a first nadir point having the lowest probability before the eleventh point P11 and a second nadir point having the lowest probability after the eleventh point P11. Herein, if there is no nadir point having the lowest probability before or after the eleventh point P11, a beginning or ending angle (i.e., 0 or 180 degree) can be assigned as the first or second nadir point.

In FIG. 12, the vehicle information processor 150 can detect a twelfth point P12 as the first nadir point having the lowest probability before the eleventh point P11, and a thirteenth point P13 corresponding to an ending angle (180 degree) as the second nadir point because there is no nadir point having the lowest probability after the eleventh point P11.

The vehicle information processor 150 can be configured to determine the eleventh point P11 as an intersecting point, to make two intersecting lines including one from the eleventh point P11 to the twelfth point P12 and the other from the eleventh point P11 to the thirteenth point P13, and to measure an angle θ2 between the two intersection lines.

Herein, a method for measuring the angle θ2 is substantially same to that shown in FIG. 11.

The vehicle information processor 150 can compare the angle θ2 with a predetermined threshold angle so as to determine whether the angle θ2 is equal to or smaller than the predetermined threshold angle.

When the angle θ2 is equal to or smaller than the predetermined threshold angle, the vehicle information processor 150 can determine an angle of the eleventh point P11 corresponding to the angle θ1 as a second vehicle angle.

When the angle θ2 is larger than the predetermined threshold angle, the vehicle information processor 150 can determine that the angle of the eleventh point P11 is not the second vehicle angle.

Herein, the threshold angle is substantially same with that shown in FIG. 11.

The angle θ2 shown in FIG. 12 is about 100 degree, so that the vehicle information processor 150 can determine that the angle of the seventh point P7 is not the second vehicle angle.

As a second method, the vehicle information processor 150 can calculate a peakedness or kurtosis of the maximum point detected in a detection region which does not include a first vehicle angle, and determine whether an angle of the maximum point is a second vehicle angle based on the peakedness or kurtosis.

For example, referring to FIG. 11, in order to determine whether the angle of the seventh point P7 is the second vehicle angle, the vehicle information processor 150 can determine a kurtosis from a predetermined angle range pivoting on the seventh point P7 (e.g., from an angle 20 degree before the seventh point P7 to an angle 20 degree after the seventh point P7).

Herein, the 20 degree is an exemplary value for a reference angle used for determining the angle range. The reference angle can be determined experimentally. Further, if the minimum point (e.g., the eighth point P8) shown in FIG. 11 may be included in the angle range, the reference angle can be adjusted to exclude the minimum point from the angle range.

Since how to calculate a kurtosis from distribution may be well known to people skilled in the art, description about that is omitted herein. If a kurtosis of distribution is 3, probability distribution could be considered normal distribution. If the kurtosis is less than 3 and becomes closer to 0, the probability distribution could be Laplace distribution. Otherwise, if the kurtosis is more than 3 and becomes larger, the probability distribution could become lanceted.

The vehicle information processor 150 can compare the calculated kurtosis with a predetermined threshold kurtosis so as to recognize whether the calculated kurtosis is equal to or larger than the threshold kurtosis.

When the calculated kurtosis is equal to or larger than the threshold kurtosis, the vehicle information processor 150 can determine an angle of the seventh point P7 corresponding to the calculated kurtosis as a second vehicle angle.

When the calculated kurtosis is smaller than the threshold kurtosis, the vehicle information processor 150 can determine that an angle of the seventh point P7 corresponding to the calculated kurtosis is not a second vehicle angle.

Herein, the threshold kurtosis is a sort of criterion to determine whether the angle of the seventh point P7 is the second vehicle angle. The threshold kurtosis can be determined experimentally. Further, the threshold kurtosis can be adjusted according to scales of probability (y-axis) and angle (x-axis). For example, the threshold kurtosis can be 4.

When an angle of the corresponding maximum point is not considered a second vehicle angle (i.e., 'NO' in the step S55), the vehicle information processor 150 does not generate an additional detection single, and then the step S60 can be executed.

When an angle of the corresponding maximum point is considered a second vehicle angle (i.e., 'YES' in the step S55), the vehicle information processor 150 can deliver, into the notification generator 160, other vehicles' information including presence of other vehicles, the number of other vehicles, degree of risk from each of other vehicles, angles of other vehicles' locations, and so on (S56).

Referring to FIG. 3, according to a detection signal outputted from the vehicle information processor 150, the notification generator 160 can generate a notification signal including information about another vehicle operating close to the subject vehicle. If detection signals regarding the first vehicle angle and the second vehicle angle are delivered sequentially, the notification generator 160 can generate notification signals regarding the detection signals in consecutive order. Receiving the information, the notification interface 200 can provide information regarding an area where sounds occur to a driver (S60).

Herein, when information regarding the first vehicle angle is provided, a degree of risk can be also provided so that a driver or an operator can easily recognize driving circumstance or condition including a relative region of where a vehicle having a higher risk (or closer proximity) is from the subject vehicle.

As above described, the vehicle can use a sound tracking system to inform a driver or operator of information regarding at least two vehicles operating around the vehicle so that a driving safety could be secured. The various embodiments disclosed herein, including embodiments of the sound tracking apparatus 100 and/or elements thereof, can be implemented using one or more processors coupled to a memory (or other non-transitory machine readable recording medium) storing computer-executable instructions for causing the processor(s) to perform the functions described above including the functions described in relation to the signal processor 110, sound recognizer 130, sound tracker 140, vehicle information processor 150, and notification generator 160.

Further, the vehicle can determine or estimate a degree of risk regarding plural vehicles operating adjacent to the vehicle, and provide which vehicle is more (or the most) dangerous and/or only filtered information based on the degree of risk of each vehicle.

The aforementioned embodiments are achieved by combination of structural elements and features of the disclosure in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the disclosure. The order of operations described in the embodiments of the disclosure may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The method in accordance with the above-described embodiment may be implemented as a computer executable program and stored in a computer readable recording medium. The computer readable recording medium may be one of a ROM, a RAM, a CD-ROM, a magnetic tape, a floppy disk, an optical data storage device, etc. Further, the computer readable recording medium may be realized in the form of a carrier wave (for example, transmission over the Internet).

The computer readable recording medium may be distributed to computer systems connected by a network and be stored and executed as code which is readable by computers in a distributed manner. Further, functional programs, code and code segments to implement the above-described method may be easily deduced by programmers in the art to which the embodiment pertains.

It will be apparent to those skilled in the art that various modifications and variations can be made in the disclosure without departing from the spirit or scope of the disclosure. Thus, it is intended that the disclosure covers the modifications and variations of this disclosure provided they come within the scope of the appended claims and their equivalents.

What is claimed is:

1. A method for providing sound tracking information, the method comprising:
   detecting a sound that has generated adjacent to a subject vehicle and generating a sound tracking result based at least on sound data from the detected sound, wherein the sound tracking result includes probability data that another vehicle exists in an area having an angle from the subject vehicle, and the probability data includes a probability value for each angle in a rearward area of the subject vehicle and includes a plurality of peak points each having a higher probability value than adjacent probability values;
   determining an angle corresponding to a first peak point having a maximum probability value among the plurality of peak points, and determining the angel corresponding to the first peak point as a first vehicle angle at which a first vehicle exists;
   determining a candidate peak point having a maximum probability value among one or more peak points of the plurality of peak points except for the first peak point, and determining whether an angle corresponding to the candidate peak point is a second vehicle angle at which a second vehicle exists; and
   generating at least one detection signal corresponding to the first and the second vehicle angles, in response to a determination that the angle corresponding to the candidate peak point is the second vehicle angle.

2. The method according to claim 1,
   wherein the sound tracking result further includes a plurality of nadir points each having a lower probability value than adjacent probability values,
   wherein the method further comprises detecting at least one peak point and at least one nadir point from the plurality of peak and nadir points in the sound tracking result,
   wherein the at least one peak point is a sole peak point in a first angle range between first two angles above and below, respectively, an angle corresponding to the at least one peak point, the first two angles each having a probability value less than the at least one peak point by a threshold value, and
   wherein the at least one nadir point is a sole nadir point in a second range between second two angles above and below, respectively, an angle corresponding to the at least one nadir point, the second two angles each having a probability value greater than the at least one nadir point by the threshold value.

3. The method according to claim 2, further comprising:
   splitting the rearward area of the subject vehicle into a non-detection region, a first detection region, and a second detection region based on the at least one nadir point.

4. The method according to claim 3, further comprising:
   skipping generation of a detection signal regarding another peak point that exists in a corresponding detection region, including the first vehicle angle, of the first and second detection regions.

5. The method according to claim 1, wherein the determining whether an angle corresponding to the candidate peak point is a second vehicle angle comprises:
   determining whether an angle between a first line and a second line is smaller than a threshold angle, wherein the first line is a line connecting the candidate peak point to a first point, an angle of which is less than the angle corresponding to the candidate peak point, and the second line is a line connecting the candidate peak point to a second point, an angle of which is greater than the angle corresponding to the candidate peak point; and
   assigning the angle corresponding to the candidate peak point as the second vehicle angle, in response to a determination that the angle between the first and second lines is smaller than the threshold angle.

6. The method according to claim 5, wherein the first point is a minimum point having a minimum probability value among angles less than the angle corresponding to the candidate peak point, and the second point is a minimum point having a minimum probability value among angles greater than the angel corresponding to the candidate peak point.

7. The method according to claim 1, wherein the determining whether an angle corresponding to the candidate peak point is a second vehicle angle comprises:
   calculating a kurtosis in a predetermined angle-range pivoting on the candidate peak point;
   determining whether the calculated kurtosis is equal to or larger than a threshold kurtosis; and
   assigning the angle corresponding to the candidate peak point as the second vehicle angle, in response to a determination that the calculated kurtosis is equal to or larger than the threshold kurtosis.

8. An apparatus for providing sound tracking information, the apparatus comprising:
   a sound tracker configured to detect a sound that has generated adjacent to a subject vehicle and to generate a sound tracking result based at least on sound data from the detected sound, wherein the sound tracking result includes probability data that another vehicle exists in an area having an angle from the subject vehicle, and the probability data includes a probability value for each angle in a rearward area of the subject vehicle and includes a plurality of peak points each having a higher probability value than adjacent probability values; and a vehicle information processor configured to:

determine an angle corresponding to a first peak point having a maximum probability value among the plurality of peak points, and determining the angel corresponding to the first peak point as a first vehicle angle at which a first vehicle exists, determine a candidate peak point having a maximum probability value among one or more peak points of the plurality of peak points except for the first peak point, and to determine whether an angle corresponding to the candidate peak point is a second vehicle angle at which a second vehicle exists, and generate at least one detection signal corresponding to the first and the second vehicle angles, in response to a determination that the angle corresponding to the candidate peak point is the second vehicle angle.

9. The apparatus according to claim 8, wherein the sound tracking result further includes a plurality of nadir points each having a lower probability value than adjacent probability values, wherein the vehicle information processor is further configured to detect at least one peak point and at least one nadir point from the plurality of peak and nadir points in the sound tracking result, wherein the at least one peak point is a sole peak point in a first angle range between first two angles above and below, respectively, an angle corresponding to the at least one peak point, the first two angles each having a probability value less than the at least one peak point by a threshold value, and wherein the at least one nadir point is a sole nadir point in a second range between second two angles above and below, respectively, an angle corresponding to the at least one nadir point, the second two angles each having a probability value greater than the at least one nadir point by the threshold value.

10. The apparatus according to claim 9, wherein the vehicle information processor is further configured to split the rearward area of the subject vehicle into a non-detection region, a first detection region, and a second detection region based on the at least one nadir point.

11. The apparatus according to claim 10, wherein the vehicle information processor is further configured to skip generation of a detection signal regarding another peak point that exists in a corresponding detection region, including the first vehicle angle, of the first and second detection regions.

12. The apparatus according to claim 8, wherein the vehicle information processor is further configured to:

determine whether an angle between a first line and a second line is smaller than a threshold angle, wherein the first line is a line connecting the candidate peak point to a first point, an angle of which is less than the angle corresponding to the candidate peak point, and the second line is a line connecting the candidate peak point to a second point, an angle of which is greater than the angle corresponding to the candidate peak point, and assign the angle corresponding to the candidate peak point as the second vehicle angle, in response to a determination that the angle between the first and second lines is smaller than the threshold angle.

13. The apparatus according to claim 12, wherein the first point is a minimum point having a minimum probability value among angles less than the angle corresponding to the candidate peak point, and the second point is a minimum point having a minimum probability value among angles greater than the angel corresponding to the candidate peak point.

14. The apparatus according to claim 8, wherein the vehicle information processor is further configured to calculate a kurtosis in a predetermined angle-range pivoting on the candidate peak point, to determine whether the calculated kurtosis is equal to or larger than a threshold kurtosis, and to assign the angle corresponding to the candidate peak point as the second vehicle angle, in response to a determination that the calculated kurtosis is equal to or larger than the threshold kurtosis.

\* \* \* \* \*